(12) United States Patent
Duncombe

(10) Patent No.: US 6,430,582 B1
(45) Date of Patent: Aug. 6, 2002

(54) GOAL SEEKING ENGINE AND METHOD FOR GENERATING CUSTOM MEDIA PRESENTATIONS

(75) Inventor: Jefferson D. Duncombe, Lake Forest, CA (US)

(73) Assignee: D4 Media, Inc., Costa Mesa, CA (US)

( * ) Notice: Subject to any disclaimer, the term of this patent is extended or adjusted under 35 U.S.C. 154(b) by 0 days.

(21) Appl. No.: 09/570,326

(22) Filed: May 12, 2000

Related U.S. Application Data

(63) Continuation-in-part of application No. 09/562,244, filed on Apr. 28, 2000.

(51) Int. Cl.[7] .............................................. G06F 15/00
(52) U.S. Cl. ................................ 707/500.1; 707/501.1; 345/723
(58) Field of Search ............................... 707/500, 500.1, 707/501.1; 345/302, 328, 723

(56) References Cited

U.S. PATENT DOCUMENTS

| | | | |
|---|---|---|---|
| 4,717,971 A | | 1/1988 | Sawyer |
| 4,746,994 A | | 5/1988 | Ettlinger |
| 5,012,334 A | | 4/1991 | Etra |
| 5,101,364 A | * | 3/1992 | Davenport et al. ......... 345/328 |
| 5,267,351 A | * | 11/1993 | Reber et al. ................ 707/104 |
| 5,274,758 A | | 12/1993 | Beitel et al. |
| 5,301,172 A | | 4/1994 | Richards et al. |
| 5,339,423 A | | 8/1994 | Beitel et al. |
| 5,355,450 A | * | 10/1994 | Garmon et al. ............. 345/501 |
| 5,550,966 A | | 8/1996 | Drake et al. |
| 5,584,006 A | * | 12/1996 | Reber et al. ................ 707/104 |
| 5,590,262 A | | 12/1996 | Isadore-Barreca |
| 5,678,012 A | * | 10/1997 | Kimmich et al. ........... 345/328 |
| 5,740,388 A | * | 4/1998 | Hunt .......................... 395/328 |
| 5,812,134 A | | 9/1998 | Pooser et al. |
| 5,828,371 A | * | 10/1998 | Cline et al. ................. 345/328 |
| 5,832,495 A | | 11/1998 | Gustman |
| 5,852,435 A | * | 12/1998 | Vigneaux et al. ........... 345/302 |
| 5,956,716 A | * | 9/1999 | Kenner et al. ................ 707/10 |
| 5,956,729 A | * | 9/1999 | Goetz et al. ................ 707/104 |
| 5,974,235 A | | 10/1999 | Nunally et al. |
| 5,983,176 A | * | 11/1999 | Hoffert et al. .............. 704/233 |
| 6,055,270 A | * | 4/2000 | Ozkan et al. ............... 375/240 |
| 6,144,391 A | * | 11/2000 | Hinson et al. .............. 345/507 |
| 6,233,226 B1 | * | 5/2001 | Gringeri et al. ............ 370/252 |

OTHER PUBLICATIONS

Andres et al., The next generation of hypermedia delivery system, IEEE, Aug. 1998, pp. 124–128.*

Dawood et al., MPEG video modelling based on scene description, IEEE, Oct. 1998, pp. 351–355, vol. 2.*

Jui–Yuan Lin, Sub–picture decoder architecture for DVD, IEEE, May 1998, pp. 246–250.*

(List continued on next page.)

Primary Examiner—Stephen S. Hong
Assistant Examiner—Cong-Lac Huynh
(74) Attorney, Agent, or Firm—Eric Karich

(57) ABSTRACT

A method of formatting at least one media file allows a user to build a custom media presentation according to parameters specified by the user. According to the method, a plurality of media clips are first defined from the at least one media file. At least two media selection parameters are then defined, each of the at least two media selection parameters having at least one of a plurality of media descriptions. Each of the plurality of media clips is then associated with at least one of the plurality of media descriptions. Once the at least one media file has been properly formatted, desired media parameters are received from the user. The method then teaches selecting a plurality of suitable media clips that are associated with the desired media descriptions, and playing the plurality of suitable media clips.

1 Claim, 8 Drawing Sheets

OTHER PUBLICATIONS

Jensen–Link et al., Effective Video Capture Techniques for Educational Multimedia, p. 3a2.30–3a2.33, vol 1, Frontiers in Education Conference, 11/95.*

Dawood et al., MPEG Video Modelling Based on Scene Description, Image Processing, pp. 351–355, vol 2, 10/98.*

Villareal et al., A Collaborative Multimedia, Web–based Electronics Course: Projection Description and Survey, pp. 39–43, vol 1, Frontiers in Education Conference, 11/96.*

Algorithms: A Functional Programming Approach, Rabhi, Fethi and Lapalme, Guy, 1999, pp 165–167 www.altavista.com Apr. 21, 2000 (general search engines).

http://tess.uspto.gov Apr. 21, 2000 (Tess search engine).

www.patents.ibm.com Apr. 21, 2000 (Patent search engine).

* cited by examiner

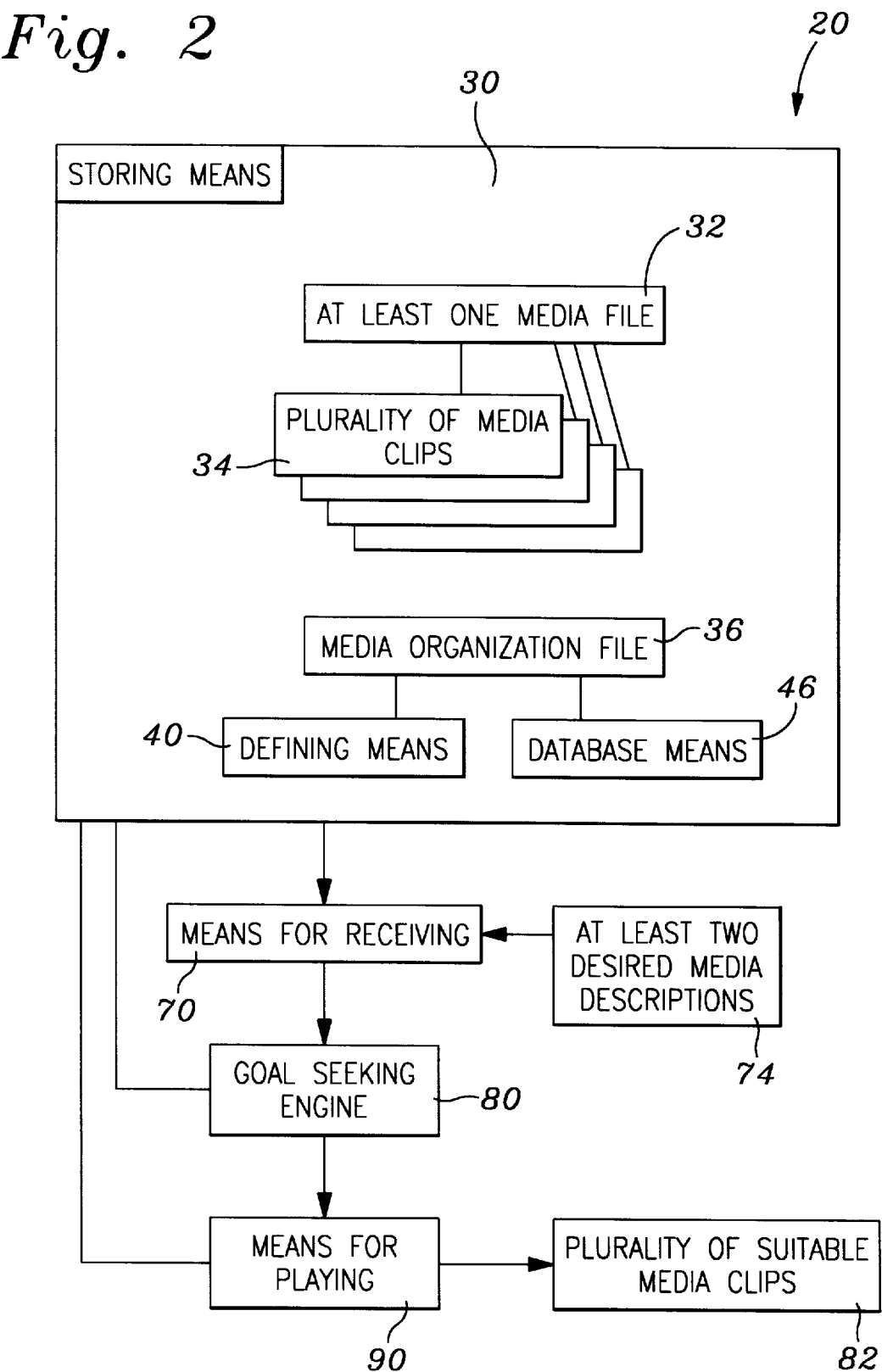

Fig. 3A

| CLIP # | FILE NAME |
|--------|-----------|
| 1 | ABE 1.AVI |
| 2 | ABE 2.AVI |
| 3 | ABE 3.AVI |
| 4 | ABE 4.AVI |

Fig. 3B

| CLIP # | FILE NAME | START POINT | RUN TIME |
|--------|-----------|-------------|----------|
| 1 | ABE.AVI | 0.00.00 | 30 S. |
| 2 | ABE.AVI | 0.00.30 | 1 MIN. 05 S. |
| 3 | ABE.AVI | 0.01.35 | 1 MIN. |
| 4 | ABE.AVI | 0.01.45 | 35 S. |

Fig. 4

| DEFINING MEANS: | | | |
|---|---|---|---|
| MEDIA SELECTION PARAMETERS: | | | |
| TOPIC PARAMETER | COMPLEXITY PARAMETER | ORDER PARAMETER | TIME PARAMETER |
| AT LEAST ONE TOPIC<br><br>EX.:<br>BIRTH TOPIC<br>EARLY CHILDHOOD TOPIC<br>EARLY PRESIDENCY TOPIC<br>CIVIL WAR TOPIC<br>SLAVERY TOPIC<br>DEATH TOPIC | AT LEAST ONE COMPLEXITY RATING<br><br>EX.:<br>1-10 | AT LEAST ONE ORDER RATING<br><br>EX.:<br>1-100 | LENGTH OF TIME<br><br>EX.:<br>0.00.00-<br>5.55.55 |

| DATABASE MEANS: | | | | |
|---|---|---|---|---|
| CLIP # | TOPIC | COMPLEXITY | ORDER | TIME (MIN.) |
| 1 | BIRTH | 1 | 1 | 10 |
| 2 | BIRTH | 1 | 1 | 5 |
| 3 | DEATH | 1 | 89 | 2 |
| 4 | DEATH | 8 | 92 | 2 |
| N | — | — | — | — |

46

GOAL SEEKING ENGINE AND METHOD FOR GENERATING CUSTOM MEDIA PRESENTATIONS

CROSS-REFERENCE TO RELATED APPLICATIONS

This application for a utility patent is a continuation-in-part of a previously filed utility patent Application having application Ser. No. 09/562,244, filed Apr. 28, 2000.

STATEMENT REGARDING FEDERALLY SPONSORED RESEARCH

Not Applicable

BACKGROUND OF THE INVENTION

1. Field of the Invention

This invention relates generally to a method of formatting media files, and more particularly to a method of formatting media files such that a user can build custom media presentations from a plurality of media clips according to parameters specified by the user.

2. Description of Related Art

The following art defines the present state of this field:

Sawyer, U.S. Pat. No. 4,717,971, discloses a method for establishing an electronic picture file composed of a plurality of individual pictures stored on several disks. The method uses an editing procedure that is controlled by a plurality of attributes selected by the user. First, the user assigns a category to each picture. The user then has the option of specifying picture order, time allotted for viewing each picture and text to accompany each picture. The system generates an electronic picture file that is organized according to these parameters.

Richards, U.S. Pat. No. 5,301,172, discloses a method of storing multimedia clips "user information items") broken by inserted "selection points." A reproducing apparatus then reproduces the multimedia clips and allows the user to direct the course of the multimedia presentation by his or her responses at the selection points. Each selection point is capable of directing the multimedia presentation to a plurality of different multimedia clips.

Beitel, U.S. Pat. No. 5,339,423, discloses a computer/software system which enables a user to produce and display an audio/visual application using a library of image, audio and story objects.

Drake, U.S. Pat. No. 5,550,966, discloses an automated presentation capture system that captures and stores audio/video/presentation inputs and stores them in a database.

Gustman, U.S. Pat. No. 5,832,495, discloses cataloging multimedia data by labeling the different "elements" or pieces of each stream of media (audio, video, etc.) and associating keywords with each element. This data can be organized in a database and searched for the purpose of locating a specific element of multimedia.

Beitel, U.S. Pat. No. 5,274,758, discloses a user/PC interface system which enables the creation and performance of a synchronized audio/visual story on the PC. The system plays an audio presentation; and the audio presentation includes "labels" that, when played, trigger the generation of video images. Since the video images are displayed when triggered by the "label", the entire presentation is synchronized.

Etra, U.S. Pat. No. 5,012,334, discloses a video image bank system for preparing an edit tape and associated edit list from a library of stock video image sequences.

Isadore-Barreca, U.S. Pat. No. 5,590,262. discloses an interactive video creation method for constructing an interactive video interface having a primary video layer, a library layer and a resource data base layer.

Ettlinger, U.S. Pat. No. 4,746,994, discloses a video-taped-based editing system that uses a plurality of video recorders and a computer-based operator's console to allow easier editing.

Pooser, U.S. Pat. No. 5,812,134, discloses a 3-D display of the contents of a database. The 3-D display provides a user with both the "position" and relationships of the information unit being examined relative to the remainder of the database, as well as the information regarding the overall size and complexity of the database.

Nunally, U.S. Pat. No. 5,974,235, discloses techniques for storing video in a database and analyzing the video image data in order to detect significant features of the images. This system is useful for analyzing the videos produced by surveillance cameras to detect intruders.

The prior art teaches various methods of ordering media files. However, the prior art does not teach a method of formatting that allows a user to build a custom media presentation according to parameters specified by the user. The present invention fulfills these needs and provides further related advantages as described in the following summary.

SUMMARY OF THE INVENTION

The present invention teaches certain benefits in construction and use which give rise to the objectives described below.

The present invention provides a method of formatting at least one media file, the formatting allowing a user to build a custom media presentation according to parameters specified by the user. According to the method, a plurality of media clips are first defined from the at least one media file. At least two media selection parameters are then defined, each of the at least two media selection parameters having at least one of a plurality of media descriptions. Each of the plurality of media clips is then associated with at least one of the plurality of media descriptions. Once the at least one media file has been properly formatted, desired media parameters are received from the user. The method then teaches selecting a plurality of suitable media clips that are associated with the desired media descriptions, and playing the plurality of suitable media clips.

A primary objective of the present invention is to provide a method of formatting at least one media file having advantages not taught by the prior art.

Another objective is to provide a method of formatting at least one media file that allows a professional to organize and classify material so that a user can utilize a goal seeking search engine to create custom media presentations that meet the requirements of the user.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a block diagram thereof;

FIG. 3A is a table showing how each of a plurality of media clips is referenced to one of at least one media file;

FIG. 3B is a table showing how each of a plurality of media clips is referenced to one media file;

FIG. 4 is a table showing a defining means of a media organization file, the defining means including a plurality of media selection parameters, each of the plurality of media selection parameters having a plurality of media descriptions;

DETAILED DESCRIPTION OF THE INVENTION

Figure 1:
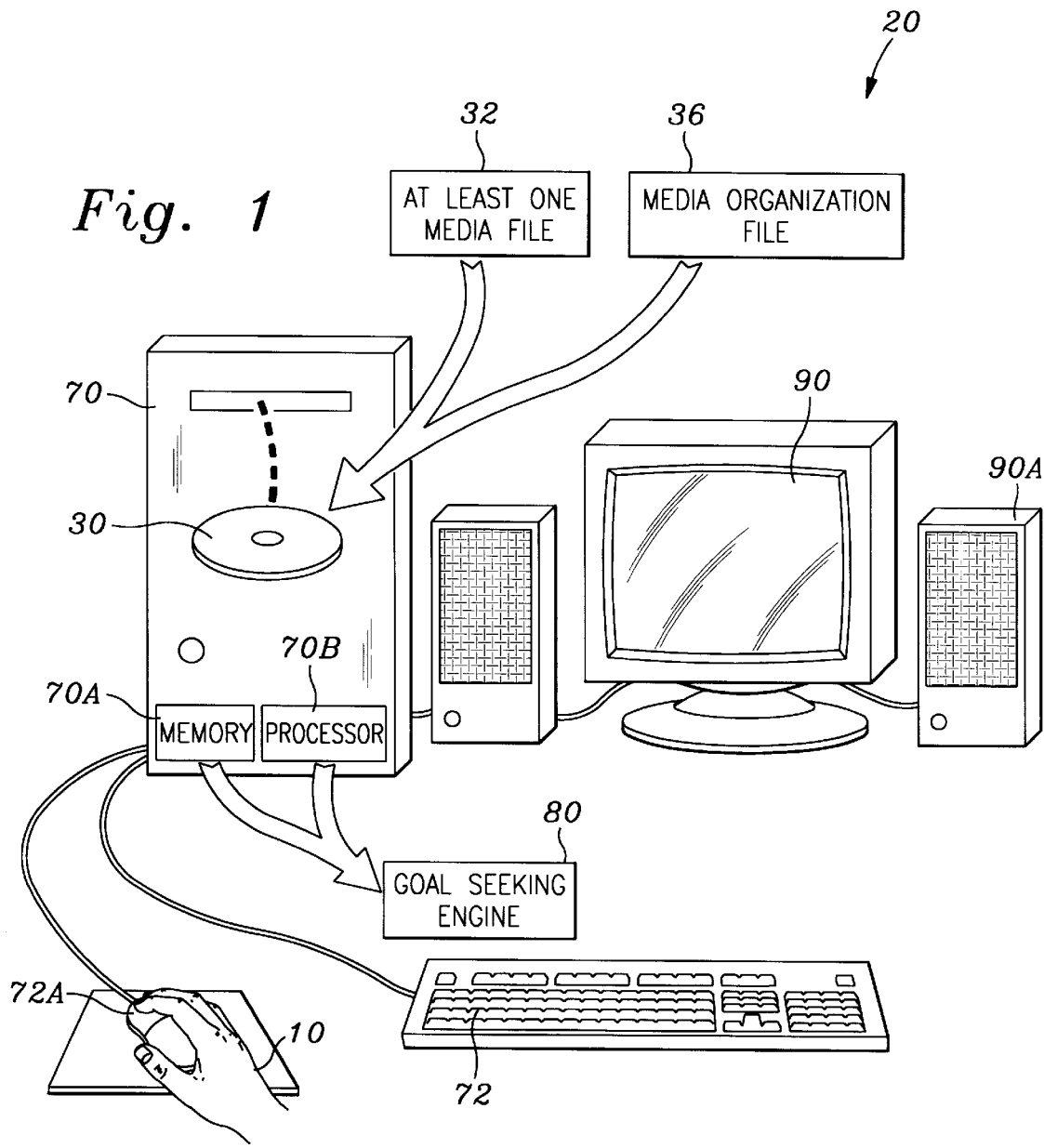
FIG. 1 is a perspective view of the preferred embodiment of the present invention.

The above described drawing figures illustrate the invention, a method for formatting at least one media file 32, the formatting allowing a user 10 to build a custom media presentation according to at least two desired media descriptions 74 specified by the user 10. In the preferred embodiment, the at least one media file 32 is formatted as described herein, and then played on a media system 20 that is capable of selecting, organizing, and playing a plurality of suitable media clips 82 drawn from at least one media file 32 according to the at least two desired media descriptions 74 entered by a user 10.

The Media System

The media system 20 of the current invention takes a unique approach to data organization that is not shown in the prior art. The media system 20 organizes data by treating it like a four-dimensional object which can be "sliced" and reorganized as desired by the user 10 to create a custom media presentation that exactly meets the requirements of the user 10. The four dimensions employed by the preferred embodiment of this technology are Width, Depth, Height, and Time. For purposes of this application, the four dimensions refer to the Topic of the media clip, the Complexity of the clip, the Order of the clips with respect to each other, and the length of Time of each clip. The specific dimensions employed, however, may be changed by those skilled in the art without avoiding the scope of this invention.

As shown in FIG. 1, the media system 20 includes a means for storing 30 ("storing means") the at least one media file 32 and a media organization file 36. The media organization file 36 includes a defining means 40 for defining at least two media selection parameters 42 (the dimensions), each of the at least two media selection parameters 42 having a plurality of media descriptions 44. The media organization file 36 further includes a database means 46 for associating each of the plurality of media clips 34 with at least one of the plurality of media descriptions 44.

The media system 20 further includes a means for receiving 70 ("receiving means") at least two desired media descriptions 74 from the user 10, and a means for selecting 80 ("selecting means") the plurality of suitable media clips 82 from the plurality of media clips 34 based upon the at least two desired media descriptions 74. In the preferred embodiment, the media system 20 further includes a means for playing 90 the plurality of suitable media clips 82.

The Storing Means

The storing means 30 is preferably a digital storage media capable of storing both the at least one media file 32 and the media organization file 36. The storing means 30 can be selected by those skilled in the art from a variety of suitable storage media, including magnetic storage disks, tapes, hard-drives, optical storage disks, memory chips, or other suitable media that are well known by those skilled in the art. In the preferred embodiment, as shown in FIG. 1, the storing means 30 is a compact disk ("CD") which can be easily packaged, sold, and transported in the same way as traditional media.

Those skilled in the art can devise many forms of storing means 30. Since the specific storing means 30 used is not critical to the novelty of the invention, any equivalent storing means 30 should be considered within the scope of this invention.

The Media File(s) and Media Clip(s)

As shown in FIG. 2, the at least one media file 32 contains the content that is to be experienced by the user 10. The at least one media file 32 can be any form of media that conveys information, including but not limited to text (such as .txt, .html, and .doc), audio (such as CD, .mp3, midi, and .wav), animation (such as flash), images (such as .jpeg and .gif) and video (such as DVD, MPEG, and .avi). The at least one media file 32 contains a plurality of media clips 34. Each of the plurality of media clips 34 represents a specific user experience; and it is the selection and combination of the plurality of media clips 34 that creates the final work which is viewed by the user 10.

As shown in FIG. 3A, in the preferred embodiment the at least one media file 32 includes many media files, each media file functioning as one of the plurality of media clips 34. While this embodiment increases the total storage space necessary to store all of the overlapping material in multiple files, it makes other aspects of the programming and function easier and faster, so this embodiment is currently preferred.

In an alternative embodiment, as shown in FIG. 3B, the at least one media file 32 is one large file from the plurality of media clips 34 are drawn. For example, one clip could be defined as the first 30 seconds of the large file; and a second clip could be defined as starting at 30 seconds and continuing for 1 minute and 5 seconds. It is possible that two or more of the plurality of media clips 34 overlap. In an example of such a case, the third clip may be defined as starting after 1 minute and 35 seconds and continuing for 1 minute, while the fourth clip may be defined as starting after 1 minute and 45 seconds and continuing for 35 seconds. In this fashion, a single media file 32 can be "cut up" into the plurality of media clips 34.

The Media Organization File

The media organization file 36 is used to enable the sorting and selection of the plurality of media clips 34. The media organization file 36 is associated with a defining means 40 for defining at least two media selection parameters 42. Each of the at least two media selection parameters 42 has a plurality of media descriptions 44. Those skilled in the art can devise a variety of media selection parameters 42, and the parameters can vary depending upon the nature of the plurality of media clips 34 and the intended use of the media system 20.

In the preferred embodiment, as shown in FIG. 4, the at least two media selection parameters 42 include a topic parameter 50 having at least one topic 52, a complexity parameter 54 having at least one complexity rating 56, an order parameter 60 having at least one order rating 62, and a time parameter 64 having a length of time 66. The at least one topic 52 preferably includes various major topics, as one would expect to see in a table of contents. The at least one complexity rating 56 and the at least one order rating 62 are preferably numerals within the range of 1–10. The length of time 66 is preferably a numeric measurement of time in an appropriate interval length. A further discussion of these parameters, as well as a practical example, is provided below.

The media organization file 36 further includes a database means 46 for associating each of the plurality of media clips 34 with at least one of the plurality of media descriptions 44. In the preferred embodiment, the database means 46 associates each of the plurality of media clips 34 with at least one of the at least one topic 52, at least one of the at least one complexity rating 56, at least one of the at least one order rating 62, and the length of time 66.

Figure 5:
FIG. 5 is a table showing a database means of the media organization file.

In a simple embodiment, as shown in FIG. 5 and as discussed below, the database means 46 is shown in a simple table assigning at least one of the plurality of media descriptions 44 to each of the plurality of media clips 34. It is important to recognize that this is a simple example—in a preferred embodiment of this technology, it is expected that the database means 46 will include a complex relational database to provide the most effective results from any given search. In such a relational database, each of the plurality of media clips 34 is associated with a different one of the plurality of media descriptions 44 depending upon the context of the search. The construction of such a relational database, according to the teachings of this invention, is within the abilities of those skilled in the art and thus does not require a more detailed discussion.

The Interface Program

Figure 6:
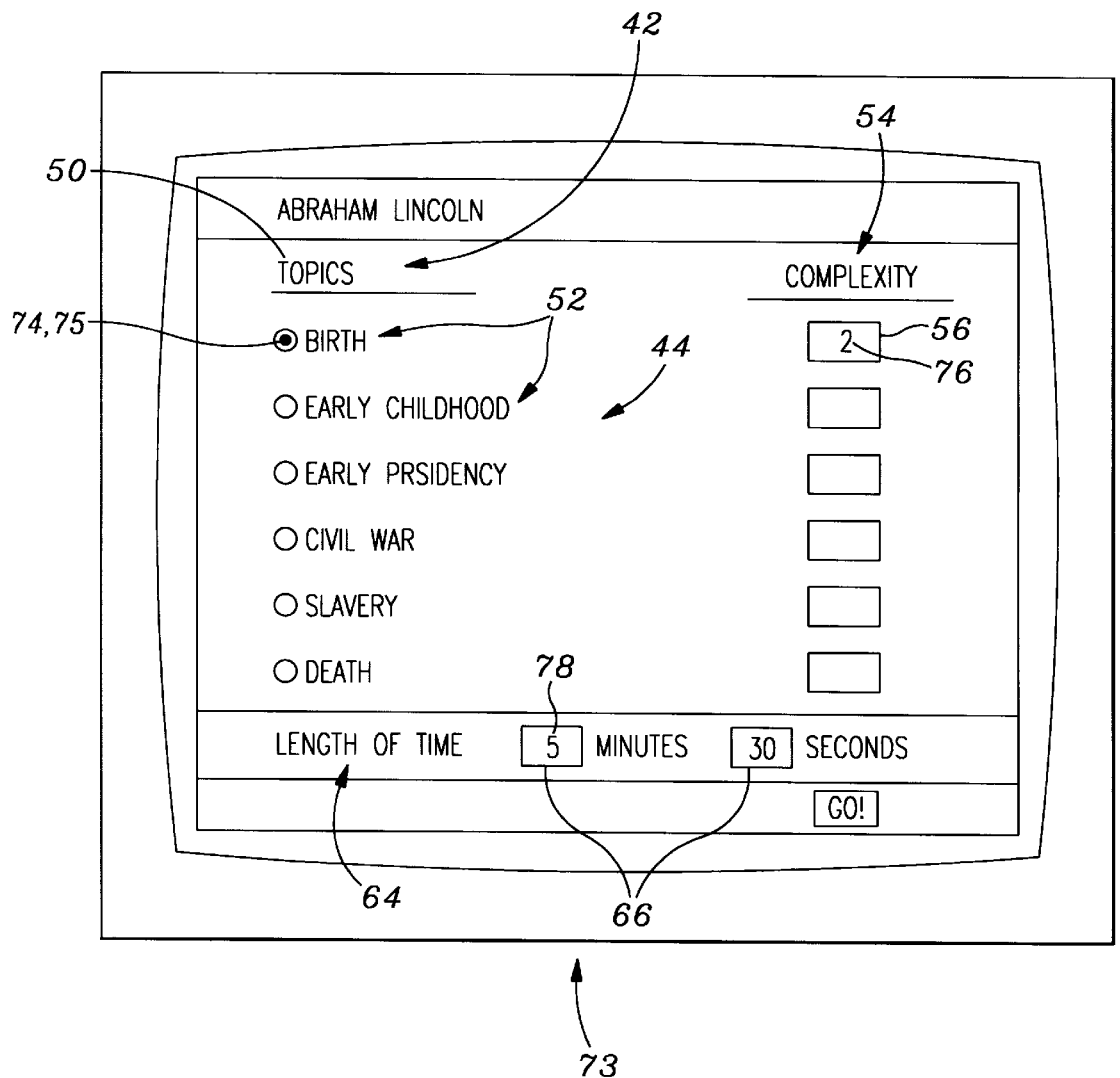
FIG. 6 is a screen display generated by an interface program.

As shown in FIG. 6, the receiving means 70 functions to receive the at least two desired media descriptions 74 from the user 10. Each of the at least two desired media descriptions 74 corresponds to one of the at least two media selection parameters 42. In the preferred embodiment, the at least two desired media descriptions 74 include a desired topic 75, a desired complexity 76, and a desired play length 78. By inputting this information, the user 10 is able to control the output of the media system 20 so the user 10 can select only appropriate portions of the media content.

As shown in FIG. 1, the receiving means 70 is preferably a personal computer having a memory 70A, a processor 70B and an interface program 73 operably installed to function thereon. The personal computer 70 is operably connected to a data input mechanism 72, such as a keyboard 72 and a mouse 72A. While the keyboard 72 and the mouse 72A are preferred, those skilled in the art can devise many equivalent mechanisms, such as a microphone and voice recognition software (not shown), and such equivalent embodiments are within the scope of the claimed invention. Since such computers and peripherals are well known in the art, a further detailed description is not required.

As shown in FIG. 6, the interface program 73 draws upon the media organization file 36 to produce a screen display on the monitor 90. The screen display allows the user 10 to use the keyboard 72 and the mouse 72A to input the desired media descriptions 74. In the preferred embodiment, the interface program 73 draws upon the media organization file 36 to produce a screen display on the monitor 90 that lists the at least one topic 52 and the at least one complexity rating 62.

Through the personal computer 70 and the keyboard 72 and the mouse 72A, the user 10 is able to input the desired media descriptions 74 into the interface program 73. In the preferred embodiment, the user 10 simply selects the desired media descriptions 74 from the plurality of media descriptions 44 and by inputting the desired play length 78, as shown in FIG. 6. While it is preferred that the user 10 directly manipulate the desired media descriptions 74, for maximum control, it should be noted that many forms of "front end" can be placed on this type of system without altering the fundamental structure of the media system 20. For example, in another embodiment the user 10 might input a "plain English" description of the presentation he or she would like. An artificial intelligence built into the interface program 73 would then determine the desired media descriptions 74 based upon techniques that are known to those skilled in the art. The selections made by the user 10 are inputted into the goal seeking engine 80, as described below.

The Goal Seeking Engine

The selecting means 80 is used for selecting a plurality of suitable media clips 82 from the plurality of media clips 34. The selecting means 80, a critical component of the media system 20, functions by comparing the plurality of desired media descriptions 74 with the plurality of media descriptions 44 and selecting the suitable media clips 82 that match the selected criteria. The selecting means 80 preferably includes a goal seeking engine 84 for performs several selection steps. First, the goal seeking engine 84 selects, from the plurality of media clips 34, only those media clips that are associated with the at least one topic 52 that matches the desired topic 75.

Second, from those media clips that are associated with the at least one topic 52, selecting only those media clips that are associated with the at least one complexity rating 56 that matches the desired complexity 76. It is important to understand that simply selecting certain complexity ratings 56 is a simplification of the final commercial product. In the preferred embodiment, the goal seeking engine 80 does not just select certain numbers, but uses mathematical averaging to select a range of numbers whose average approximately matches the desired complexity 76. The user 10 ultimately has control over the range of discretion allowed the goal seeking engine 80, and in the preferred embodiment the user 10 can adjust the "advanced controls" of the goal seeking engine 80 to fine tune the amount of variation that the goal seeking engine 80 is allowed.

Third, from those media clips that are associated with both the at least one topic 52 that matches the desired topic 75 and the at least one complexity rating 56 that matches the desired complexity 76, the goal seeking engine 80 selects the plurality of suitable media clips 82 which are not duplicates, based on the order rating 62, and the sum of whose length of time 66 is approximately equal to the desired play length 78. Finally, the plurality of suitable media clips 82 are ordered based on the order rating 62. Once again, a linear solution to the process of ordering the plurality of suitable media clips 82 is a simplified version of the preferred embodiment. In the preferred embodiment, the goal seeking engine 80 uses relational database techniques to assign different order ratings 62 to each of the plurality of suitable media clips 82 based upon which other media clips have been selected.

The goal seeking engine 84 preferably includes a software program that implements a knapsack algorithm. The knapsack algorithm 84 sorts the potentially available combinations of the plurality of media clips 34 to select the plurality of suitable media clips 82 that most closely match the requested characteristics, yet still fit within the desired play length 78. The knapsack algorithm 84, or an equivalent, is critical because it is expected that, in many searches, many of the plurality of media clips 34 meet the requirements described by the user 10—and it is necessary to select only some of the plurality of media clips 34 to arrive at a result that matches the length of time 66 requested by the user 10. The knapsack algorithm 84 sorts these possibilities and determines a combination that most closely fits the needs of the user 10. A more detailed discussion of the knapsack algorithm 84 is contained in Algorithms, A Functional Programming Approach, 2d Edition, by Fethi Rabhi and Guy Lapalme, hereby incorporated by reference in full.

The knapsack algorithm 84 preferably also has the ability to allow for repetition of material to create the most effective final product. In the preferred embodiment, in cases in which the sum of the lengths of time 66 of the plurality of suitable media clips 82 is less than the desired play length 78, or when otherwise suitable, the goal seeking engine 84 has the ability to insert additional media clips which either overlap or are duplicates of one or more of the plurality of suitable media clips 82. Suitable duplicates can be determined based upon the desired topic 74, the desired complexity 76, the length of time 66, and the order parameter 60 associated with each of the clips. For example, if the media organization file 36 shows that two of the plurality of media clips 34 overlap and have the same order parameter 60, with one clip being 5 minutes and the second being 2 minutes, the goal seeking engine 84 will initially select the 5 minute clip for display. Then, if there is additional time available, the goal seeking engine 84 might select the 2 minute segment to repeat and emphasize the point. This is particularly likely to occur if the 2 minute media clip contains information that is close to the complexity or interest specified by the user 10.

In many cases, the knapsack algorithm 84 can sort the results of a search to create a media experience in which the sum of the length of time 66 of all of the plurality of suitable media clips 82 is almost exactly equal to the desired play length 78. However, it is only required that the sum of the length of time 66 of all of the plurality of suitable media clips 82 be approximately equal to the desired play length 78. For purposes of this invention, the sum need only roughly approximate the desired play length 78. In some searches, there may be a substantial difference between the sum and the desired play length 78. In the preferred embodiment, the user 10 can control how close that goal seeking engine 80 can come to its goal. For example, the user 10 might request a 30 minute presentation and allow 15 minutes in variation. In another example, the user might request a 2 minute presentation that must be exactly 2 minutes. In most cases, the goal seeking engine 80 should be able to very closely meet even the most stringent requirements of the user 10; however, greater processing time will be required to meet stringent search criteria. A carefully prepared and formatted media organization file 36 makes it possible for the sum and the desired play length 78 to be nearly exactly equal.

Much of the success of the media system 20 depends upon the creation and editing of the media organization file and the plurality of media clips 34. If the plurality of media clips 34 are long and not skillfully edited, the search results will be of lower quality. It is worth noting, however, that a poorly executed search engine, which are not efficient in this matching step, should still considered within the scope of this invention. The requirement that "the sum of the length of time 66 of all of the plurality of suitable media clips 82 be approximately equal to the desired play length 78" should not be construed as requiring that another search engine be effective in matching the sum and the desired play length 78 in order to infringe. It is also worth noting that if the user 10 requests a very narrow field of data and the desired play length 78 is very large, the media presentation may be significantly shorter than the desired play length 78; although the use of repetition by the goal seeking engine 80 could potentially alleviate the disparity.

The Media Player

In the preferred embodiment, the media system 20 further includes a means for playing 90 the plurality of suitable media clips 82. In the preferred embodiment, the playing means 90 is a monitor 90 and a pair of speakers 90A that are operatively attached to the personal computer 70. The monitor 90 and the pair of speakers 90A are well known in the prior art and do not constitute an inventive aspect of the invention. It is possible that many devices might be devised by those skilled in the art to play the media formatted according to the teachings of this invention, and these alternative embodiments should be considered within the scope of this invention.

The Method of Use

In an example of a practical application of this technology, we will describe the use of the above-described technology to format and view a movie about Abraham Lincoln.

Figure 7:
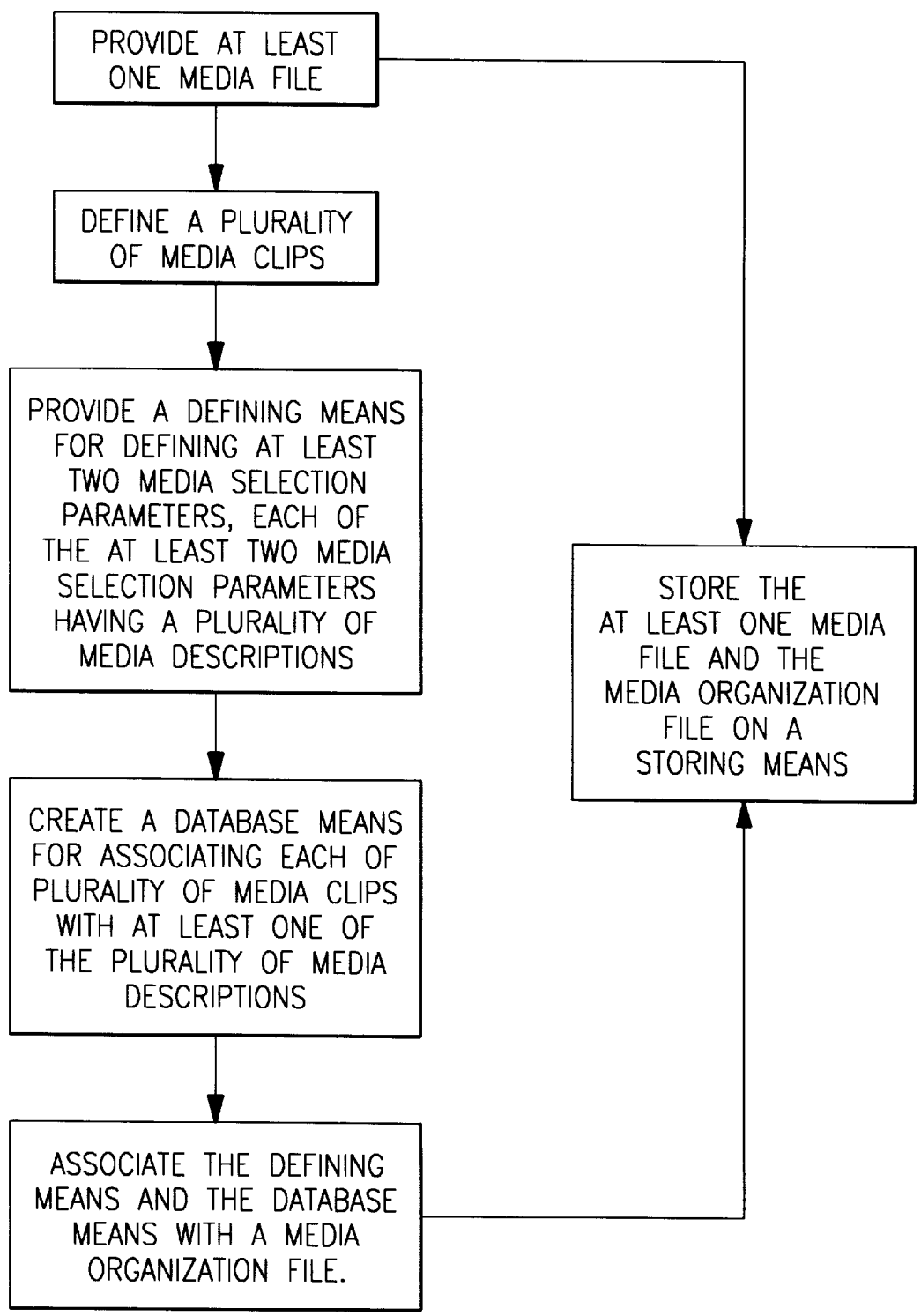
FIG. 7 is a flow diagram showing the steps used to produce the media organization file.

According to the teachings of this invention, as shown in FIG. 7, the movie is first segmented into the plurality of files 32, each of the plurality of files 32 containing a discrete segment of the movie and representing one of the plurality of media clips 34. Determining how to properly edit and select each of the plurality of media clips 34 requires a great deal of skill, creativity and experience, so it expected that this will be performed by a professional.

The professional then creates the defining means 40 to define the at least two media selection parameters 42 and their respective plurality of media descriptions 44. According to the preferred embodiment, the media selection parameters 42 include at least one topic 52, a complexity parameter 54 having at least one complexity rating 56, an order parameter 60 having at least one order rating 62, and a time parameter 64 having a length of time 66; however, it should be kept in mind that other parameters may be devised by those skilled in the art.

In the current example involving the life of Abraham Lincoln, the professional could then create topics 52 that are relevant to the life of Abraham Lincoln, such as a birth topic, an early childhood topic, an early presidency topic, a civil war topic, a slavery topic, and a death topic. The professional would then define the complexity rating 56, such as 1–10, with 1 including very general information and 10 including very specific details. Finally, the professional would then define the at least one order rating 62, such as a scale of 1–100, with 1 including being the first clip in the story and 100 being the last clip. As described above, the use of a linear scale is a simplified version to facilitate understanding of the invention. In the preferred embodiment, the database means 46 would be a relational database would allow the plurality of media clips 34 to be organized relative to each other, allowing a large plurality of complexity ratings 56 and order ratings 62 to be associated with each of the plurality of media clips 34.

Once the defining means 40 has been created, each of the plurality of media clips 34 is then categorized in the database means 46. In this step, each of the plurality of media clips 34 is then associated with at least one of the at least one topic 52, at least one of the at least one complexity rating 56, and at least one of the at least one order rating 62. Completing the relational database 46 described above would often be a long and difficult task, but it would provide the best response to the query of the user 10. Finally, each of the plurality of media clips 34 is associated with the length of time 66 of the media clip, which is objectively determined.

Following the example described above, FIG. 5 shows a sample table categorizing four media clips. The first media clip, 10 minutes generally describing the birth of Abraham Lincoln, is categorized under the topic of birth, with a complexity of 1, and order of 1, and a time of 10 minutes. The second media clip, a 5 minute segment of the first media clip which eliminates some of the background material included in the first clip, is categorized under the topic of birth, with a complexity of 1, and order of 1, and a time of 5 minutes. The third media clip, a 2 minute clip generally describing the assassination of Abraham Lincoln, is categorized under the topic of death, with a complexity of 1, and order of 89, and a time of 2 minutes. The fourth media clip, a 2 minute clip describing certain particular details of the assassination, is categorized under the topic of death, with a complexity of 8, and order of 92, and a time of 2 minutes.

Once the professional has constructed the media organization file 36, it is stored on the storing means 30 along with the plurality of media clips 34. According to the preferred embodiment of this invention, the storing means 30 is a CD which is then distributed to consumers who are interested in the life of Abraham Lincoln. As described above, it is equally acceptable to distribute the described files via the global computer network or another known method of data distribution.

Figure 8:
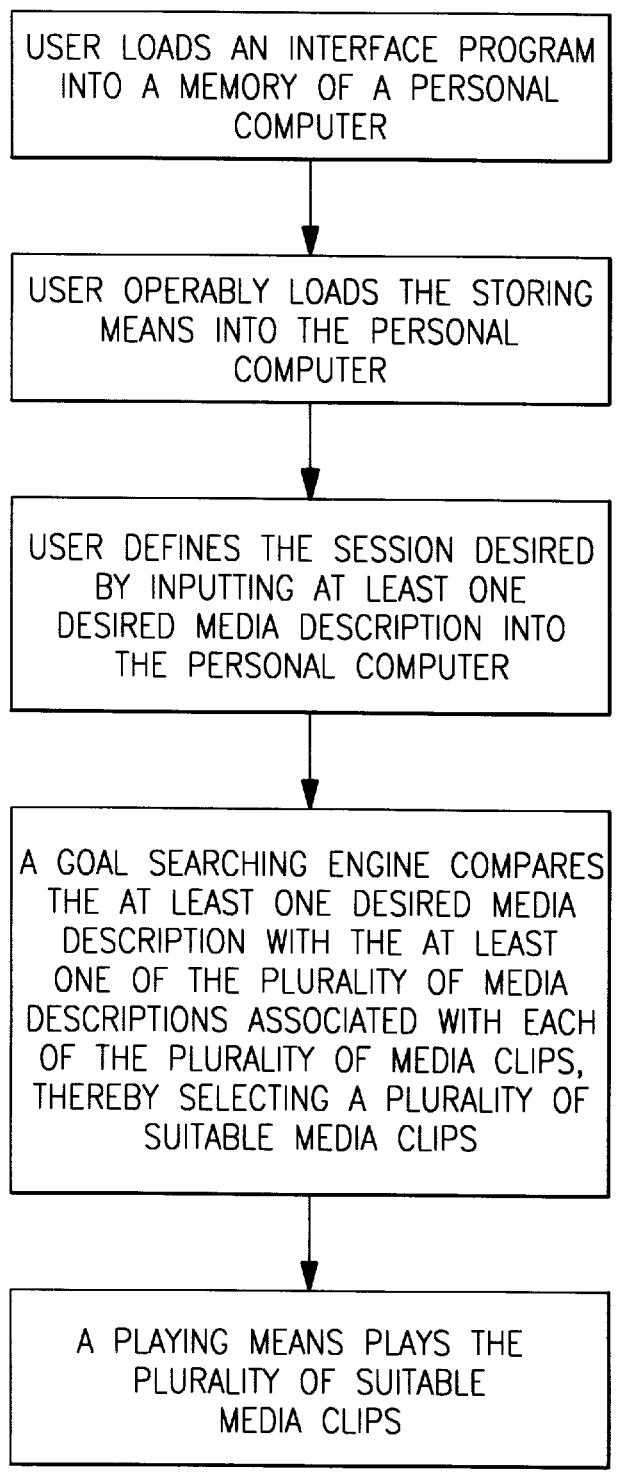
FIG. 8 is a flow diagram showing the steps taken by a user to select and view a plurality of suitable media clips.

The user 10 then loads the described files into the personal computer 70 by inserting the CD 30, downloading the file, and activating the interface program 73. As shown in FIG. 6, the user 10 is presented the list of selections described above. Based upon the input of the user 10, as shown in FIG. 8, the goal searching engine means 84 selects the plurality of suitable media clips 82 for transmission to the playing means 90.

In the current example, the user 10 might select a 15 minute overview of the life of Lincoln. In this case, the goal seeking engine 84 would select clips 1 and 3 because they are of suitable complexity, and play clip 1 and then clip 3 based on their order. Clip number 2 would be rejected based upon the order parameter 60 because the goal searching engine would recognize that clips 1 and 2 are duplicates, and clip 1 is of a more suitable length. If the user 10 had requested only 7 minutes of presentation, the goal searching engine means 84 would elect clips 2 and 3 as a more suitable combination.

Once the user 10 had viewed the overview, he or she may request 2 minutes of further details of the death of Lincoln, in which case the goal searching engine would reject clips 1 and 2 as the incorrect topic, but play clip 4 based upon meeting the stated criteria and meeting the time restrictions.

Of course, a typical product would often contain many hundreds or even thousands of media clips 34, allowing extremely complex presentations that can be customized in any respect to the needs of the user 10. This exceptional flexibility and customization allow enormous amounts of data to be readily searched, even by those unfamiliar with the field of the material, because the material has already been classified and organized by the professional that is knowledgeable in the field.

Other Embodiments

While we have referred to the distribution of a CD 30 having at least one media file 32 that can then be customized by the user 10, it is also possible to utilize this technology in other ways. In an alternative embodiment, the storing means 30 is a central computer hard-drive of a central computer (not shown) operably connected to at least one personal computer 70 via a network such as a global computer network. The central computer (not shown) is programmed by one skilled in the art to directly download data to any of the personal computers that request the data. In one embodiment, the central computer downloads the at least one media file 32 and the media organization file 36 to the hard-drive or RAM of one of a network of personal computers via a global computer network. In another embodiment, the at least one media file 32 and the media organization file 36 remain resident on the central computer, and only the plurality of suitable media clips 82 are transmitted to the personal computer, via either download or streaming technologies. As will be recognized by those skilled in the art, this allows content providers to sell content in small and customized packages rather than just in bulk. The user 10 could obtain a small segment of content, presumably for a lower cost, rather than be required to purchase an entire work. It also allows the content provider to collect fees for each segment of the work, rather than only one fee for the entire work.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for playing a selected portion of at least one media file, the method comprising the steps of:

defining a plurality of media clips from the at least one media file;

defining at least one topic, at least one complexity rating, and at least one order rating, the at least one complexity rating providing a rating of the complexity of one of the plurality of media clips, the at least one order rating defining a presentation sequence of the plurality of media clips;

measuring each of the plurality of media clips to determine a length of time of each of the plurality of media clips;

providing a database means for associating each of the plurality of media clips with one of the at least one topics, one of the at least one complexity ratings, one of the at least one order ratings, and the length of time measured;

associating, in the database means, each of the plurality of media clips with the length of time measured;

associating, in the database means, each of the plurality of media clips with at least one of the at least one topic;

associating, in the database means, each of the plurality of media clips with at least one of the at least one complexity rating;

associating, in the database means, each of the plurality of media clips with at least one of the at least one order rating;

providing a goal seeking engine;

receiving, into the goal seeking engine, a desired topic, a desired complexity, and a desired play length, the goal seeking engine performing the steps of:

selecting from the plurality of media clips only those media clips that are associated with the at least one topic that matches the desired topic;

selecting from those media clips that are associated with the at least one topic only those media clips that are associated with the at least one complexity rating that matches the desired complexity;

selecting, from those media clips that are associated with both the at least one topic that matches the desired topic and the at least one complexity rating that matches the desired complexity, a plurality of suitable media clips which are not duplicates, based on the order rating, and the sum of whose length of time is approximately equal to the desired play length;

sorting the plurality of suitable media clips based on the order rating; and playing the plurality of suitable media clips.

* * * * *